Feb. 17, 1948. C. S. DEWEY, JR 2,436,065
APPARATUS FOR MOLDING CORED ARTICLES OF ORGANIC PLASTIC MATERIAL
Filed Dec. 27, 1944 3 Sheets-Sheet 1

Witness:
A. A. Horn

Inventor:
Charles S. Dewey, Jr.
by John R. Hobson
Attorney.

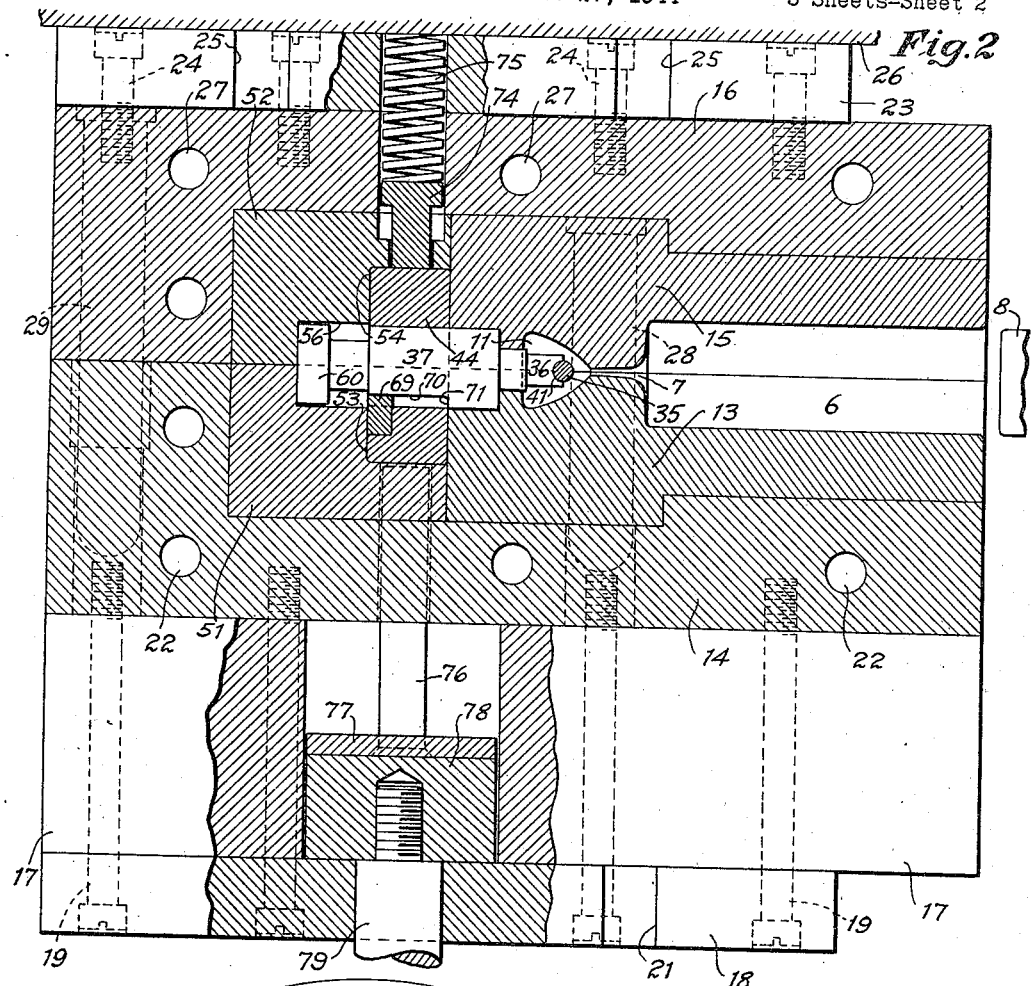
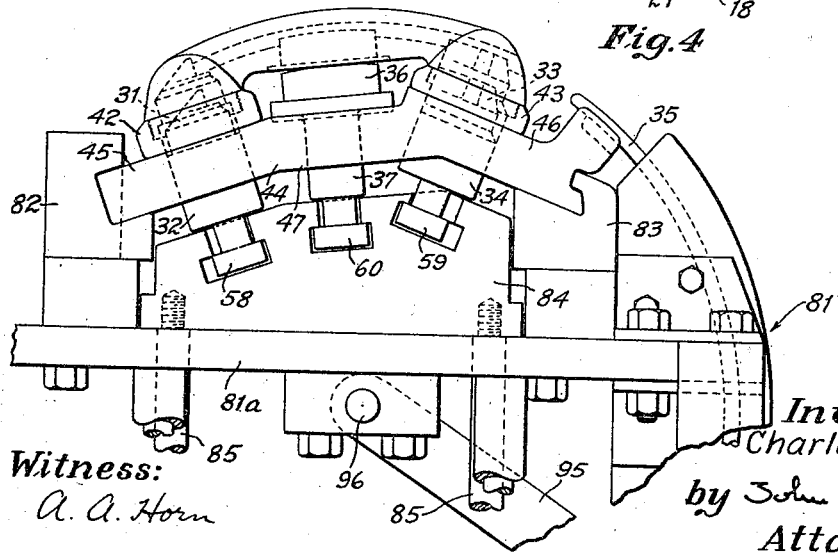

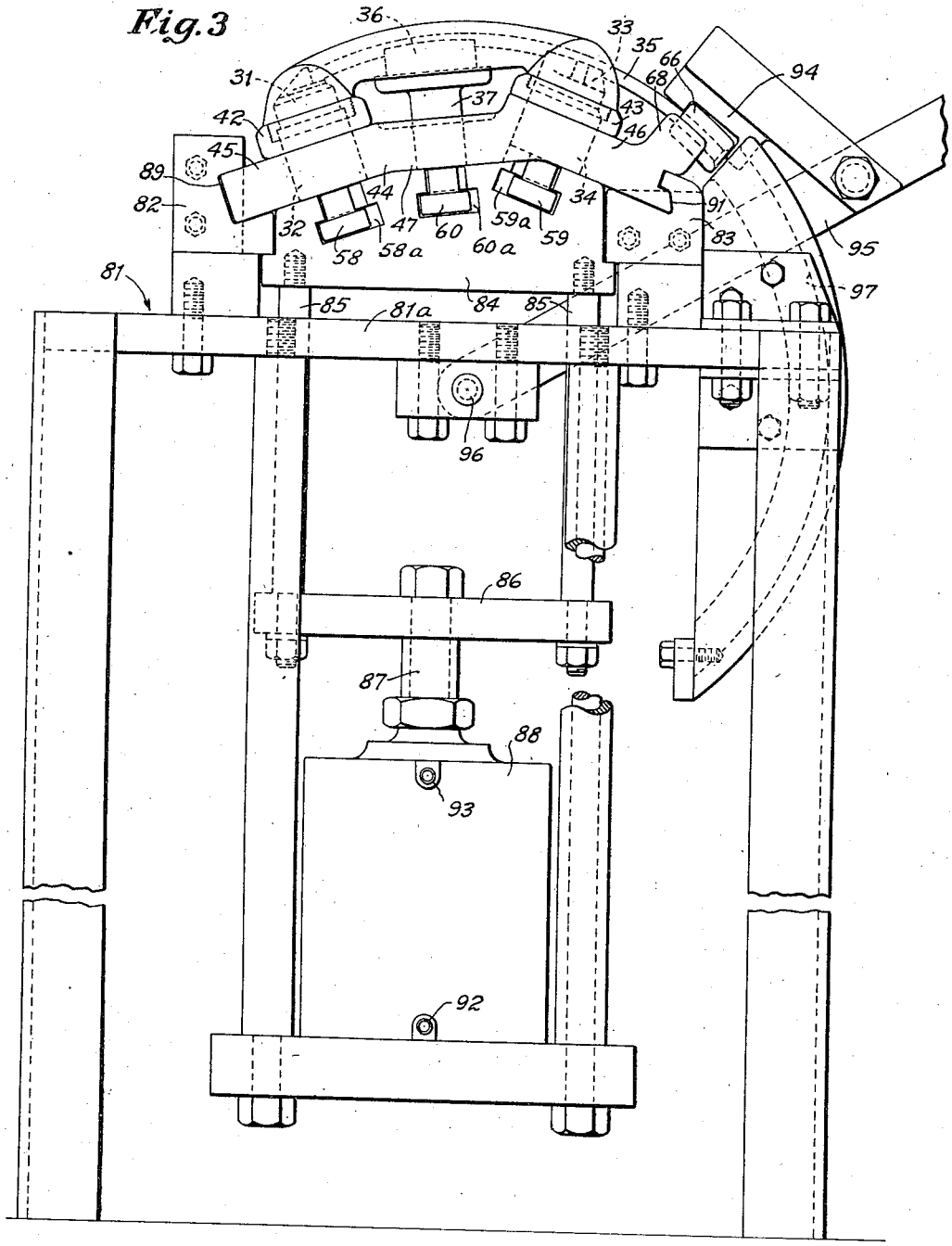

Patented Feb. 17, 1948

2,436,065

UNITED STATES PATENT OFFICE 2,436,065

APPARATUS FOR MOLDING CORED ARTICLES OF ORGANIC PLASTIC MATERIAL

Charles S. Dewey, Jr., Far Hills, N. J., assignor to Shaw Insulator Company, Irvington, N. J., a corporation of New Jersey Application December 27, 1944, Serial No. 569,955

8 Claims. (Cl. 18—42)

This invention relates to apparatus for molding cored articles of organic plastic materials, that is, articles having hollow portions formed about cores which are held in the mold. It has particular relation to the molding of a telephone hand set in a closed mold in which are located a plurality of cores to form recesses or holes for the transmitter and the receiver portions of the hand set and for other purposes.

The general object of the invention is to provide novel apparatus for holding cores in a closed mold so constructed and arranged that the cores may be set in the mold as a unit, removed with the molded piece and drawn from the molded piece in an efficient manner and with less manual effort than heretofore required.

Another object is to provide novel molding apparatus comprising a mold and cooperating core assembly adapted to be placed in the mold as a unit and to be removed with the molded piece and novel means for pulling and resetting the cores.

Other objects and advantages of the invention will be pointed out in, or will become apparent from, the following specification or from the accompanying drawings to which reference is made and in which drawings:

Fig. 2 is a view in vertical sectional elevation taken approximately on the line 2—2 of Fig. 1 looking in the direction of the arrows;

Fig. 3 is a view in front elevation of the core assembly and molded piece and cooperating core pulling and setting mechanism, the parts being shown in readiness for pulling the cores; and Fig. 4 is a view of the upper part of the apparatus of Fig. 3 showing the parts after the cores have been pulled from the molded piece.

Figure 1:
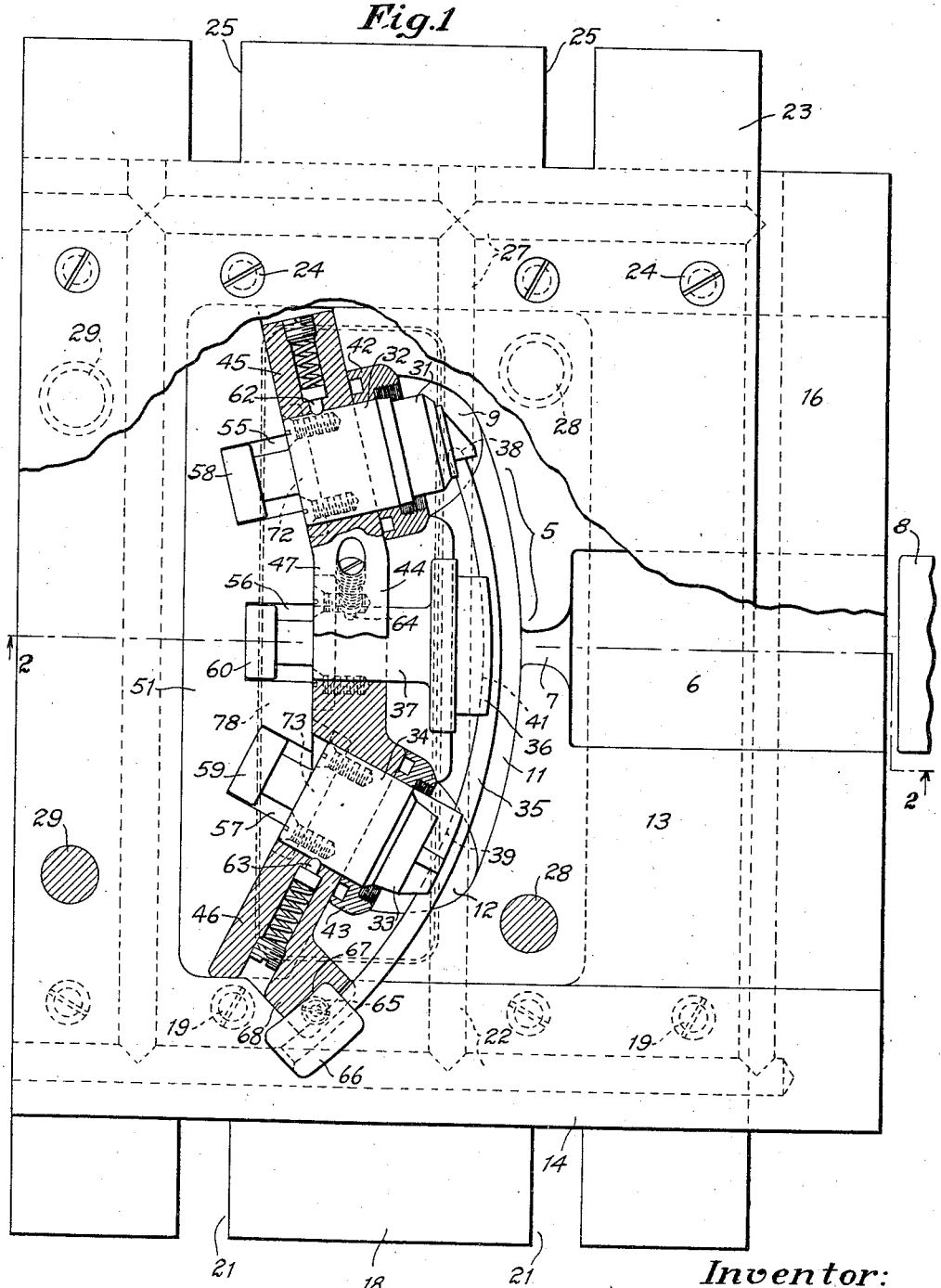
Figure 1 is a view in horizontal sectional top plan, partially broken away, of a mold and cooperating core assembly embodying the invention.

The mold shown in Figs. 1 and 2 is of the closed type, such as is used in transfer molding, that is in molding thermosetting plastic material by heating it and then charging it into the closed mold in which reaction of the material is completed.

The mold comprises a cavity indicated generally at 5, Fig. 1, and a loading chamber 6 connected to the cavity by sprue 7, and which receives a force 8 operated by suitable means, not shown, to charge the mold with material placed in the chamber 6. If desired, the loading chamber may be formed separately from the mold, in known manner.

The cavity 5, together with the cores which are placed therein as described below, has the form of a telephone hand set and comprises the receiver forming portion 9, connected by handle forming portion 11, to transmitter forming portion 12.

Considering now the general construction of the mold, it will be seen from Fig. 2 that the lower half or set 13 of the die fits in a shoe or chase 14 and the upper, complementary half 15 of the die fits in the upper chase or retainer 16.

The chase 14 is secured to parallels or spacer blocks 17 and to a bottom plate 18 by screws 19 which pass through the plate and blocks and are screwed into the chase 14 as shown. The ends of plate 18 are slotted at 21, Fig. 1, and screws, not shown, extend through these slots for securing the plate to a press platen, also not shown. Chase 14 is cored as at 22, Figs. 1 and 2, for the circulation of a heating or cooling medium through the chase to heat or cool the die.

The upper chase or retainer 16 is secured to a top plate 23, Figs. 1 and 2, by screws 24 and the ends of said plate are slotted at 25 to connect the plate and upper part of the die structure to an upper press platen indicated at 26, Fig. 2. The chase 16 also is cored as at 27 for the circulation through it of a heating or cooling medium.

The die parts 13 and 15 may be held in registry by guide pins 28 and 29, Figs. 1 and 2.

Considering now the core assembly, a core 31 on plunger 32 is positioned in cavity portion 9 to form the interior of the receiver portion of the hand set, a core 33 on plunger 34 forms the interior of the transmitter portion of the hand set in cavity portion 12, and a curved, slender core 35 extends through cavity portions 12 and 11 and into portion 9 to form a wire passage leading from the receiver portion through the handle and through and out of the transmitter portion of the hand set. Another core 36 on a plunger 37 may be used to provide an opening in the underside of the handle leading into the wire passage of the set.

Cores 31, 33 and 36 may be provided with insert pins (not shown) and are shaped to serve as supports for core 35. Thus core 31 is recessed to receive and hold the inner end of core 35 as indicated at 38, Fig. 1, core 33 is grooved as indicated at 39 to fit core 35 and core 36 is similarly grooved at 41, Figs. 1 and 2.

Cores 31 and 33 have threaded rings 42 and 43 associated therewith for forming screw threads on the receiver and transmitter portions or shells of the hand set. These rings have a sliding fit on plungers 32 and 34 and the inner ends of die members 13 and 15 are shaped to fit around the outer sides of the rings as illustrated in Fig. 1.

The plungers 32, 34 and 37 and the core 35 are mounted in a coreholder 44. The coreholder 44 is approximately bow-shaped, the end portions 45 and 46, in which plungers 32 and 34 are mounted, having obtuse angular relation to the central portion 47 in which plunger 37 is mounted. In other words, the three portions of the coreholder are at right angles to the three plungers respectively and the plungers 32 and 34 are arranged at acute angles to plungers 37, the center line of which coincides with the transverse center line of the die cavity. Consequently the cores 31 and 33 extend into the die cavity along diverging lines to form the recesses in the hand set in corresponding positions while core 36 is at a right angle to the flat side of handle forming portion 11 of the die cavity. Stated otherwise, the center lines of plungers 32 and 34 form acute angles with the center line of plunger 37.

The coreholder 44 fits against the inner ends of the die halves 13 and 15 which are shaped to the contiguous side of the coreholder. Thus, coreholder 44 holds rings 42 and 43 in position in the die as shown in Fig. 1. The coreholder 44 is held against the inner ends of the die halves and is held vertically so as to position the cores with their center lines in the parting line of the mold, by bottom butt bar 51 in chase 14 and a complementary top butt bar 52 in chase 16 which bars are cut out at 53 and 54 respectively to engage the rear side and the bottom and top sides of the coreholder as clearly shown in Fig. 2. Thus a cavity is formed within the die structure in which the coreholder is enclosed and held.

The butt bars 51 and 52 also have recesses 55, 56 and 57 formed therein in which snugly fit the ends of plungers 32, 34 and 37 which consist of flanges 58, 59 and 60 which constitute coupling means for pulling and resetting the cores, as explained below. The ends of the plungers abut the bottoms of said cavities to prevent outward movement of the cores under pressure applied in the die cavity by the plastic material.

The plungers 32, 34 and 37 are yieldingly held in set or operative position in coreholder 44 by spring pressed detents 62, 63 and 64 which seat in holes formed in the sides of the plungers. A spring pressed detent indicated at 65 similarly engages and yieldingly holds a block 66 in which is fixed the outer end of core 35 and which fits in a recess 67 in projection 68 of the coreholder. The chases 14 and 16 are recessed to fit over block 66 to rigidly hold the core 35 in operative position. Block 66 serves as a coupling means to pull core 35 from the molded piece as explained below.

Plunger 37 is prevented from turning about its axial center line and pulling of the core is stopped by a plate 69 set in the coreholder below the plunger and secured therein by screws as indicated in Fig. 1. The top of plate 69 engages a flat surface 70 cut in the underside of the plunger and leaving a shoulder 71 which strikes the inner side of the plate when the core is pulled. Similar plates 72 and 73, Fig. 1, are likewise provided for plungers 32 and 34 to prevent them from turning and to stop their pulling movements.

Preferably the coreholder 44 has a tight sliding fit in the coreholder cavity 53—54 to insure accurate positioning of the cores in the die cavity 5. To assist in removing the core assembly and molded piece, knockout plungers such as shown at 74 engaged by springs as shown at 75 may be located in position to engage the top of the coreholder when the die is closed. This compresses and loads the springs which act to disengage the coreholder and molded piece from the top butt bar 52 and upper die half 15 when the mold is opened. The coreholder and molded piece (to which sprue and cull, not shown, may be attached) may be disengaged from the bottom butt bar 51 and lower die half 13 by knockout pins, such as shown at 76, so located as to engage the bottom side of the coreholder when pushed upwardly. Pins 76 may be held in a pin plate 77 on a knockout bar 78 operated by suitable means, not shown, connected thereto by rod 79.

The core assembly and molded hand set may now be lifted from the die for the core pulling operation which is accomplished by the means and in the manner described below.

The coreholder is slid horizontally into a fixture 81, Figs. 3 and 4, which comprises locating blocks 82 and 83 secured to the top of frame 81a, and puller bar 84 on rods 85 connected to crosshead 86 on rod 87 of a piston, not shown, in air cylinder 88.

Block 82 has a horizontal slot 89 formed in it to receive the end portion 45 of the coreholder 44 and block 83 is similarly sloted at 91 to receive the end of portion 46 of the coreholder. The slots are undercut to hold down the coreholder.

When the coreholder is slid into the locating blocks, puller bar 84 is held in raised position as by means of air pressure admitted to cylinder 88 through a pipe 92 and exhaust of air through pipe 93. This permits the flanged ends of plungers 58, 59 and 60 to enter slots 58a, 59a and 60a formed transversely in the puller bar 84, and shaped to the profile of the plunger ends but substantially oversized as shown. This provides a coupling of flanges 58, 59 and 60 to the puller bar 84. Slots 58a and 60a are oversized to the right and slot 59a to the left having regard to the positions of the parts as shown in Fig. 3.

The fixture 81 also includes a clamp 94 shaped to fit over block 66 of core 35 and pivotally mounted on lever 95 pivoted at 96 to the underside of the frame 81a. Lever 95 extends through a curved guideway 97 shaped to guide block 66 which is moved therethrough in an arc of the same curvature as core 35.

By these means, core 35 is pulled out of the hand set in an arc which is of the same curvature as the core, thus preserving the shape of the core and preventing injury to the molded hand set. The core 35 is so pulled by placing clamp 94 on block 66 and pulling down lever 95. The core is shown withdrawn in Fig. 4.

The cores 31, 33 and 36 may now be pulled out to the positions shown in Fig. 4 and this is done by admitting air pressure to cylinder 88 through pipe 93 and exhausting air through pipe 92 which pulls all the cores at once. In this operation, the plunger ends slide transversely in slots 58a, 59a and 60a, this being permitted by making the slots over-sized as described above and being necessary because the plungers have to be drawn in lines at angles to each other and to the line of movement of the puller bar. This shifting of the plungers in the slots is seen by comparing Fig. 4 with Fig. 3.

The cores having all been pulled, the handset can be removed and rings 42 and 43 unscrewed therefrom. The cores 31, 33 and 36 are now reset by raising puller bar 84. This projects the plungers upwardly until bar 84 strikes the underside of holder 44 at which time detents 62, 63 and 64 will seat and hold the plungers in operative positions. Core 35 also is now reset by raising lever 95 until the inner end of the core enters recess 38 in core 31 and detent 65 is seated in block 66. Clamp 94 is then disengaged from block 66. Rings 42 and 43 are replaced on plungers 32 and 34. The core assembly is now returned to the die structure and placing it in the coreholder cavity 53—54 and closing the die will serve to locate all the cores in the desired positions in the mold cavity.

It will be understood that changes may be made in the illustrated embodiment of the invention without departing from the scope of the appended claims.

Having described my invention, what I claim is:

1. Apparatus for molding a cored article of organic plastic material comprising a two-part die structure of the closed type, a molding cavity in said die structure, a removable core assembly for forming said article comprising a coreholder, cores movably supported by said coreholder, and having set positions relative to the mold cavity and the coreholder, means within said die structure for engaging and holding said coreholder and said cores in the set positions in said molding cavity, means for charging said molding cavity with said material to mold said article, and means for unsetting and resetting said cores in said coreholder.

2. Apparatus for molding a cored article of organic plastic material comprising a two-part die structure of the closed type, a molding cavity in said die structure in which said article is formed, a removable core assembly for said die structure comprising a coreholder, plungers slidably mounted in said coreholder, cores on said plungers, means yieldingly holding said plungers in set positions in said coreholder, means within said die structure for enclosing said coreholder and removably holding it in fixed position to locate said cores in the desired positions in said molding cavity, means for filling said molding cavity with said material to form said article, and means for reciprocating said plungers to pull said cores from said article and to reset said cores for another molding operation.

3. Apparatus for molding a cored article of organic plastic material comprising a two-part die structure of the closed type, a molding cavity in said die structure in which said article is formed, a removable core assembly for forming said article comprising a coreholder, plungers slidably mounted in said coreholder, cores on said plungers, detents for holding said plungers in set positions in said coreholder, another core engaging said first-named cores, a detent for holding said other core in set position in said core assembly, means within said die structure for enclosing said coreholder and removably holding it in fixed position to locate said cores in the desired positions in said molding cavity, means for charging said molding cavity with said material to form said article, and means for pulling and resetting said cores.

4. Apparatus for molding a cored article of organic plastic material comprising a two-part die structure of the closed type, a removable core assembly for forming said article comprising a coreholder, cores movably supported by said coreholder, means for holding said cores in set positions in said coreholder, means for removably holding said core assembly in fixed position within said die structure to locate said cores in the desired positions in said molding cavity, means for charging said cavity with said material to form said article on said cores, knockout means for dislodging the core assembly and molded article from said die structure, and means for unsetting and resetting said cores in said coreholder.

5. Molding apparatus comprising a two-part die structure having a molding cavity therein, a coreholder having a plurality of cores operably associated therewith and capable of being pulled and reset relative thereto, detents for yieldingly holding said cores in relatively fixed positions in said coreholder, a cavity in said die structure adjacent said molding cavity for receiving said coreholder and removably holding it in position so as to locate said cores in set positions in said molding cavity, and coupling means operatively connected to said cores for pulling and resetting said cores.

6. Molding apparatus comprising a two-part die structure having a molding cavity therein, a core assembly comprising a coreholder, plungers operably mounted for pulling and resetting in said coreholder and having cores thereon, detents for yieldingly holding said cores in fixed positions in said coreholder, another core engaging said first-named cores, a detent for yieldingly holding said other core in fixed position in said coreholder, coupling means on said first-named cores and said other core for pulling and resetting said cores, and means for removably holding said core assembly in fixed position within said die structure to locate said cores in the desired positions in said molding cavity.

7. Apparatus for molding a cored article of organic plastic material comprising a two-part die structure of the closed type, complementary die members having a molding cavity therein located in said die structure, a removable core assembly for forming said article, said core assembly comprising a coreholder and cores operably supported by said coreholder for pulling and setting relative thereto, complementary butt bars in said die structure abutting said die members, a cavity formed in said butt bars shaped to removably receive, enclose and hold said coreholder in fixed position to locate said cores in the desired positions in said molding cavity, means for charging said molding cavity with said material to form said article over said cores, and means for pulling and resetting said cores.

8. Apparatus for molding telephone hand sets of organic plastic material comprising a two-part die structure of the closed type, complementary die members in said die structure having a cavity formed therein to mold said hand set, a removable core assembly comprising a coreholder, cores carried by said coreholder to form the interiors of transmitter and receiver portions and to form a wire passage through a handle portion of said hand set, said coreholder comprising a central portion and end portions formed at angles to said central portion, plungers slidably mounted in said end portions carrying said transmitter and receiver forming cores, a block in one of the end portions of said coreholder connected to said wire passage forming core, means for removably holding said core assembly in said die structure to locate said cores in the desired positions in said molding cavity, means for charging said molding cavity with said material, and means including said plungers and said block for pulling and resetting said cores in said coreholder.

CHARLES S. DEWEY, JR.

REFERENCES CITED

The following references are of record in the file of this patent:

UNITED STATES PATENTS

| Number | Name | Date |
|---|---|---|
| 2,262,053 | Schultz | Nov. 11, 1941 |
| 2,293,633 | Shaw | Aug. 18, 1942 |
| 1,645,732 | Vaughan | Oct. 18, 1927 |